United States Patent
Paddon et al.

(10) Patent No.: US 9,191,862 B2
(45) Date of Patent: Nov. 17, 2015

(54) METHOD AND APPARATUS FOR ADJUSTING TCP RTO WHEN TRANSITING ZONES OF HIGH WIRELESS CONNECTIVITY

(75) Inventors: Michael W. Paddon, Tokyo (JP); Craig M. Brown, Harbord (AU)

(73) Assignee: QUALCOMM Incorporated, San Diego, CA (US)

(*) Notice: Subject to any disclaimer, the term of this patent is extended or adjusted under 35 U.S.C. 154(b) by 655 days.

(21) Appl. No.: 13/226,002

(22) Filed: Sep. 6, 2011

(65) Prior Publication Data

US 2013/0058231 A1  Mar. 7, 2013

(51) Int. Cl.
*H04W 28/18* (2009.01)
*H04L 1/18* (2006.01)
*H04W 24/00* (2009.01)

(52) U.S. Cl.
CPC .............. *H04W 28/18* (2013.01); *H04L 1/188* (2013.01); *H04W 24/00* (2013.01)

(58) Field of Classification Search
CPC ...... H04L 1/188; H04W 28/18; H04W 24/00; H04W 28/04
USPC ............................ 370/232, 252, 389; 709/224
See application file for complete search history.

(56) References Cited

U.S. PATENT DOCUMENTS

| | | | |
|---|---|---|---|
| 2002/0045443 A1 | 4/2002 | Hunzinger | |
| 2002/0150048 A1* | 10/2002 | Ha et al. | 370/231 |
| 2006/0059256 A1* | 3/2006 | Kakani | 709/224 |
| 2006/0126652 A1* | 6/2006 | Berry et al. | 370/410 |
| 2007/0133416 A1 | 6/2007 | Hyon et al. | |
| 2007/0195769 A1 | 8/2007 | Lin | |
| 2007/0265000 A1* | 11/2007 | Hanson et al. | 455/432.1 |
| 2011/0110230 A1* | 5/2011 | Zhuang | 370/230 |

FOREIGN PATENT DOCUMENTS

| | | |
|---|---|---|
| EP | 1450521 A2 | 8/2004 |
| EP | 1494121 A1 | 1/2005 |
| EP | 1798913 A2 | 6/2007 |
| JP | H04110098 A | 4/1992 |
| JP | H11163946 A | 6/1999 |
| JP | 2000261496 A | 9/2000 |
| JP | 2004524720 A | 8/2004 |
| WO | 2005055546 A1 | 6/2005 |

OTHER PUBLICATIONS

International Search Report and Written Opinion—PCT/US2012/053783—ISA/EPO—Dec. 17, 2012.

* cited by examiner

*Primary Examiner* — Pao Sinkantarakorn
*Assistant Examiner* — Richard Chang
(74) *Attorney, Agent, or Firm* — Won Tae C. Kim

(57) ABSTRACT

Systems and methods for managing transmissions of a mobile device are described herein. An example of a mobile device described herein includes an environment monitor module configured to perform one or more observations of a local environment associated with the mobile device, a connectivity tracker module communicatively coupled to the environment monitor module and configured to determine whether the one or more observations indicate wireless connectivity of the mobile device has been restored, and a retransmit timeout (RTO) manager module communicatively coupled to the connectivity tracker module and configured to reset at least one RTO value of the mobile device if the wireless connectivity of the mobile device has been determined to be restored.

40 Claims, 5 Drawing Sheets

METHOD AND APPARATUS FOR ADJUSTING TCP RTO WHEN TRANSITING ZONES OF HIGH WIRELESS CONNECTIVITY

BACKGROUND

Wireless communication devices are incredibly widespread in today's society. For example, people use mobile devices such as cellular phones, smart phones, personal digital assistants, laptop computers, pagers, tablet computers, etc. to send and receive data wirelessly from countless locations. Moreover, advancements in wireless communication technology have greatly increased the versatility of today's wireless communication devices, enabling users to perform a wide range of tasks from a single, portable device that conventionally required either multiple devices or larger, non-portable equipment.

The Transmission Control Protocol (TCP) is a widely deployed and utilized protocol for communicating via the Internet. As specified by TCP, communicating devices are configured to provide positive acknowledgement of received data segments. If segment(s) are not acknowledged in a timely fashion, the sender retransmits the non-acknowledged segment(s). This retransmission is governed by a time interval referred to as the retransmit timeout (RTO).

Conventionally, RTO utilizes an exponential "back-off" mechanism on successive retransmits, such that RTO exponentially increases with each such retransmit. However, this RTO backoff mechanism can adversely impact the connectivity of mobile devices. For instance, a mobile device can encounter bursty connectivity patterns, e.g., when moving between areas of high connectivity and areas of low connectivity, or the like. In such a scenario, exponential RTO backoff can cause substantial delay in reestablishing communication upon entry into an area of high connectivity. Further, if the RTO has backed off to a sufficiently high value, a mobile device transiting between areas of high and low connectivity may fail entirely to reestablish communication within a given high-communication area.

SUMMARY

An example of a mobile device includes an environment monitor module configured to perform one or more observations of a local environment associated with the mobile device; a connectivity tracker module communicatively coupled to the environment monitor module and configured to determine whether the one or more observations indicate wireless connectivity of the mobile device has been restored; and a retransmit timeout (RTO) manager module communicatively coupled to the connectivity tracker module and configured to reset at least one RTO value of the mobile device if the wireless connectivity of the mobile device has been determined to be restored.

Implementations of the mobile device may include one or more of the following features. The RTO manager module is further configured to reset the at least one RTO value by setting the at least one RTO value to approximately zero. The RTO manager module is further configured to identify one or more active Transmission Control Protocol (TCP) sessions associated with the mobile device and to reset RTO values corresponding to the one or more active TCP sessions. The RTO manager module is further configured to apply random offsets to the RTO values corresponding to the one or more active TCP sessions. The RTO manager module is further configured to identify one or more active applications associated with the mobile device and to reset RTO values corresponding to TCP sessions associated with the one or more active applications. The environment monitor module includes a user activity tracker module configured to monitor user interaction with the mobile device. The RTO manager module is further configured to identify an application associated with the user interaction and to reset the at least one RTO value of the mobile device if the application associated with the user interaction has at least one open TCP session. The environment monitor module includes a radio link layer (RLL) observation module configured to observe local link layer connectivity associated with the mobile device. The RTO manager module is further configured to reset the at least one RTO value of the mobile device if the RLL observation module indicates that link layer connectivity associated with the mobile device is restored. The RTO manager module is further configured to reset the at least one RTO value of the mobile device if at least one TCP session associated with the mobile device successfully completes a transmission or reception. The RTO manager module is further configured to reset a retransmit timer associated with the at least one RTO value of the mobile device if the wireless connectivity of the mobile device has been determined to be restored.

An example of a method of adjusting TCP RTO values of a mobile device includes performing one or more observations of a local environment associated with the mobile device; determining whether the one or more observations indicate wireless connectivity of the mobile device has been restored; and resetting at least one RTO value of the mobile device if the wireless connectivity of the mobile device has been determined to be restored.

Implementations of the method may include one or more of the following features. Setting the at least one RTO value to approximately zero. Identifying one or more active TCP sessions associated with the mobile device, where the resetting includes resetting RTO values corresponding to the one or more active TCP sessions. Applying random offsets to the RTO values corresponding to the one or more active TCP sessions. Identifying one or more active applications associated with the mobile device, where the resetting includes resetting RTO values corresponding to TCP sessions associated with the one or more active applications. Monitoring user interaction with the mobile device. Identifying an application associated with the user interaction, where the resetting includes resetting the at least one RTO value of the mobile device if the application associated with the user interaction has at least one open TCP session. Observing local link layer connectivity associated with the mobile device. Resetting the at least one RTO value of the mobile device if the local link layer connectivity associated with the mobile device is indicated to have been restored. Resetting the at least one RTO value of the mobile device if at least one TCP session associated with the mobile device successfully completes a transmission or reception. Resetting a retransmit timer associated with the at least one RTO value of the mobile device if the wireless connectivity of the mobile device has been determined to be restored.

Another example of a mobile device includes means for performing one or more observations of a local environment associated with the mobile device; means for determining whether the one or more observations indicate wireless connectivity of the mobile device has been restored; and means for resetting at least one RTO value of the mobile device if the wireless connectivity of the mobile device has been determined to be restored.

Implementations of the mobile device can include one or more of the following features. Means for setting the at least one RTO value to approximately zero. Means for identifying one or more active TCP sessions associated with the mobile device, where the means for resetting includes means for resetting RTO values corresponding to the one or more active TCP sessions at least in part by applying random offsets to the RTO values corresponding to the one or more active TCP sessions. Means for monitoring user interaction with the mobile device. Means for identifying an application associated with the user interaction, where the means for resetting includes means for resetting the at least one RTO value of the mobile device if the application associated with the user interaction has at least one open TCP session. Means for observing local link layer connectivity associated with the mobile device. Means for resetting the at least one RTO value of the mobile device if the local link layer connectivity associated with the mobile device is indicated to have been restored. Means for resetting the at least one RTO value of the mobile device if at least one TCP session associated with the mobile device successfully completes a transmission or reception. Means for resetting a retransmit timer associated with the at least one RTO value of the mobile device if the wireless connectivity of the mobile device has been determined to be restored.

An example of a computer program product resides on a processor-readable medium and includes processor-readable instructions configured to cause a processor to perform one or more observations of a local environment associated with a mobile device; determine whether the one or more observations indicate wireless connectivity of the mobile device has been restored; and reset at least one RTO value of the mobile device if the wireless connectivity of the mobile device has been determined to be restored.

Implementations of the computer program product may include one or more of the following features. Processor-readable instructions configured to cause the processor to set the at least one RTO value to approximately zero. Processor-readable instructions configured to cause the processor to identify one or more active TCP sessions associated with the mobile device, and processor-readable instructions configured to cause the processor to reset RTO values corresponding to the one or more active TCP sessions at least in part by applying random offsets to the RTO values corresponding to the one or more active TCP sessions. Processor-readable instructions configured to cause the processor to monitor user interaction with the mobile device. Processor-readable instructions configured to cause the processor to identify an application associated with the user interaction, and processor-readable instructions configured to cause the processor to reset the at least one RTO value of the mobile device if the application associated with the user interaction has at least one open TCP session. Processor-readable instructions configured to cause the processor to observe local link layer connectivity associated with the mobile device. Processor-readable instructions configured to cause the processor to reset the at least one RTO value of the mobile device if the local link layer connectivity associated with the mobile device is indicated to have been restored. Processor-readable instructions configured to cause the processor to reset the at least one RTO value of the mobile device if at least one TCP session associated with the mobile device successfully completes a transmission or reception. Processor-readable instructions configured to cause the processor to reset a retransmit timer associated with the at least one RTO value of the mobile device if the wireless connectivity of the mobile device has been determined to be restored.

DETAILED DESCRIPTION

Techniques are described herein for managing a retransmission schedule of a mobile device, e.g., as defined by a TCP RTO parameter. RTO is a network congestion avoidance parameter of TCP that delays retransmissions of information associated with a failed transmission (e.g., due to low or no connectivity, among other factors). RTO utilizes exponential backoff such that the delay between retransmissions increases for each successive failed transmission. However, this RTO backoff results in a loss of user experience in various cases. For example, in a scenario in which a mobile device moves rapidly between zones of high wireless connectivity and zones of low wireless connectivity, RTO backoff may cause TCP sessions associated with the mobile device to delay as the mobile device enters a high connectivity zone. In some cases, the TCP sessions may fail to resume at all if the time spent in the high connectivity zone is smaller than the present RTO. Thus, techniques herein leverage observations of a local environment associated with a mobile device to reset the RTO (e.g., set the RTO to zero or a small nonzero value), as well as one or more timer mechanisms operating according to the RTO, upon detecting transit from a zone of low connectivity to a zone of high connectivity based on the observations.

Items and/or techniques described herein may provide one or more of the following capabilities, as well as other capabilities not mentioned. Mobile devices can be made more adaptable to changes in surrounding wireless connectivity. Device responsiveness and user experience can be improved. Network communication at a mobile device can be conducted with improved efficiency. The conventional TCP RTO parameter can be modified to provide adaptability for mobile use cases. While at least one item/technique-effect pair has been described, it may be possible for a noted effect to be achieved by means other than that noted, and a noted item/technique may not necessarily yield the noted effect.

Figure 1:
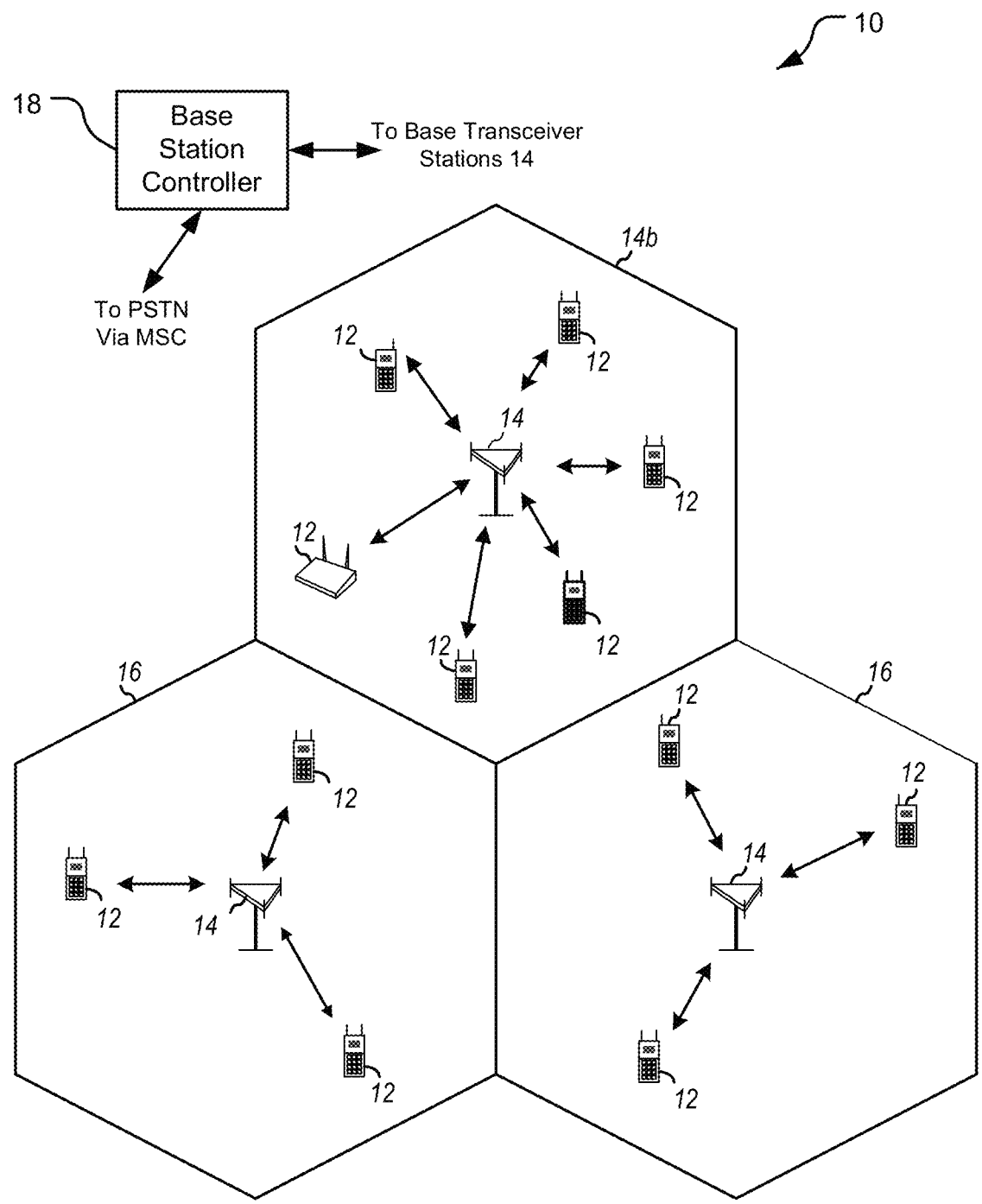
FIG. 1 is a schematic diagram of a wireless telecommunication system.

Referring to FIG. 1, a wireless communication system 10 includes various devices, such as mobile access terminals 12 (ATs), base transceiver stations (BTSs) 14 disposed in cells 16, and a base station controller (BSC) 18. The system 10 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTSs 14 can wirelessly communicate with the ATs 12 via antennas. Each of the BTSs 14 may also be referred to as a base station, an access point, an access node (AN), a Node B, an evolved Node B (eNB), etc. The BTSs 14 are configured to communicate with the ATs 12 under the control of the BSC 18 via multiple carriers. Each of the BTSs 14 can provide communication coverage for a respective geographic area, here the respective cells 16. Each of the cells 16 of the BTSs 14 is partitioned into multiple sectors as a function of the base station antennas.

The system 10 may include only macro base stations 14 or it can have base stations 14 of different types, e.g., macro, pico, and/or femto base stations, etc. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

The ATs 12 can be dispersed throughout the cells 16. The ATs 12 may be referred to as terminals, mobile stations, mobile devices, user equipment (UE), subscriber units, etc. The ATs 12 shown in FIG. 1 include mobile telephones, personal digital assistants (PDAs) and vehicular navigation and/or communication systems, but can also include wireless routers, other handheld devices, netbooks, notebook computers, etc.

Figure 2:
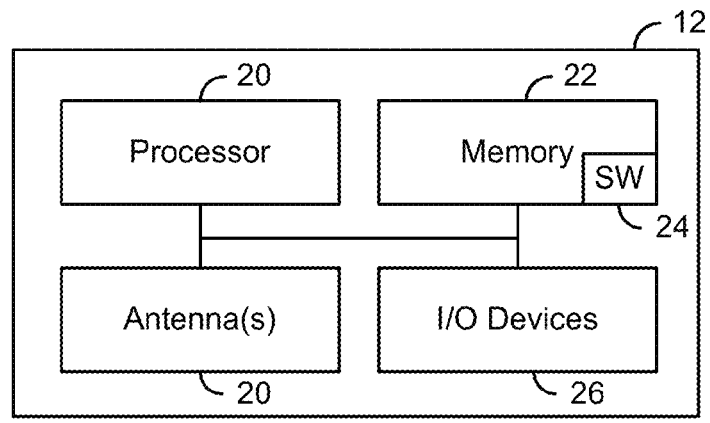
FIG. 2 is a block diagram of components of a mobile station shown in FIG. 1.

Referring also to FIG. 2, an example one of the ATs 12 comprises a computer system including a processor 20, memory 22 including software 24, input/output (I/O) device(s) 26 (e.g., a display, speaker, keypad, touch screen or touchpad, etc.) and one or more antennas 28. The antenna(s) 28 provide communication functionality for the AT 12 and facilitates bi-directional communication with the BTSs 14. The antenna(s) 28 can operate based on instructions from a transmitter and/or receiver module, which can be implemented via the processor 20 (e.g., based on software 24 stored on memory 22) and/or by other components of the AT 12 in hardware, software, or a combination of hardware and/or software.

The processor 20 is an intelligent hardware device, e.g., a central processing unit (CPU) such as those made by Intel® Corporation or AMD®, a microcontroller, an application specific integrated circuit (ASIC), etc. The memory 22 includes non-transitory storage media such as random access memory (RAM) and read-only memory (ROM). The memory 22 stores the software 24 which is computer-readable, computer-executable software code containing instructions that are configured to, when executed, cause the processor 20 to perform various functions described herein. Alternatively, the software 24 may not be directly executable by the processor 20 but is configured to cause the computer, e.g., when compiled and executed, to perform the functions.

The mobile device 12 is operable to communicate with other devices via one or more networks or internetworks, e.g., the Internet. The mobile device 12 uses various protocols, such as TCP and Internet Protocol (IP), to communicate data to and/or from other devices. With regard to TCP, said protocol specifies that endpoints are to provide positive acknowledgement of received data segments. If segments are not acknowledged in a timely fashion, the sender of the segments recovers by retransmitting said segments.

Retransmission of data segments in TCP is governed by a dynamically calculated timeout known as RTO. Conventionally, RTO is calculated using, in part, an exponential backoff mechanism on successive retransmits. This backoff mechanism, which is widely utilized in TCP implementations, facilitates network stability in the event that the network becomes overloaded. However, a TCP endpoint operating over a wireless link (e.g., a mobile device 12 communicating over a wireless network) may experience packet loss for reasons other than network congestion. For instance, a mobile device in a subway may only have connectivity at stations in relatively short bursts (e.g., of around 60 seconds), separated by significant periods of zero connectivity (e.g., several minutes) while the train is in transit. Similar bursty connectivity patterns can occur when users move around a building, into and out of wireless "dead zones," etc.

When connectivity is lost for several minutes, the exponential backoff mechanism provided within TCP causes the RTO to quickly increase. In some conventional TCP implementations, RTO is allowed to reach or exceed 60 seconds after a maximum period (e.g., 127 seconds) of attempted retransmits. In practice, a long RTO may be reached even more quickly in some circumstances. Furthermore, while some conventional TCP implementations define limits on the RTO on the order of 60 seconds, other implementations permit the RTO to become significantly larger.

Because of this RTO backoff, a TCP endpoint (e.g., a mobile device 12) which is passing through a zone of high connectivity for a short period may fail to leverage said connectivity, as the endpoint is configured to wait through a substantially long period associated with the RTO in order to retransmit, receive an acknowledgement and identify that the link is again effective. This relatively long wait yields reduced and sub-optimal user experience for interactive applications. For instance, a user generally expects connectivity to be poor when traveling through a subway, when low signal strength is indicated on a device display, or the like. However, while at a station, upon observation of a high signal strength indicated on the device display, or other such scenarios, a lack of TCP activity and application responsiveness due to RTO may be confusing and/or a substantial inconvenience to the user.

Moreover, the impact of RTO on application responsiveness while rapidly traveling through areas of high and low connectivity is stochastic and subject to random chance. For instance, the RTO may cause a retransmit timer to expire just after a TCP endpoint reaches a zone of high connectivity, or the RTO may instead persist through the entire stay in the high connectivity area. As each TCP session at a given device maintains a distinct RTO, applications which use multiple TCP connections (e.g., Ajax-based web sites, etc.) may appear to a user to be partially functional and partially frozen. This lack of determinism further degrades the user experience in such a scenario.

Techniques are described herein which leverage observations of a local environment associated with a mobile device to reset the RTO (e.g., set the RTO to zero or a small nonzero value, such as approximately 1 second or any other suitable value) upon detecting transit from a zone of low connectivity to a zone of high connectivity. Additionally, one or more retransmit timers associated with the RTO can be reset in combination with the RTO. In doing so, TCP implementations operating in a wireless mobile environment can take advantage of contextual awareness in order to adjust RTO values for an optimal user experience.

Figure 3:
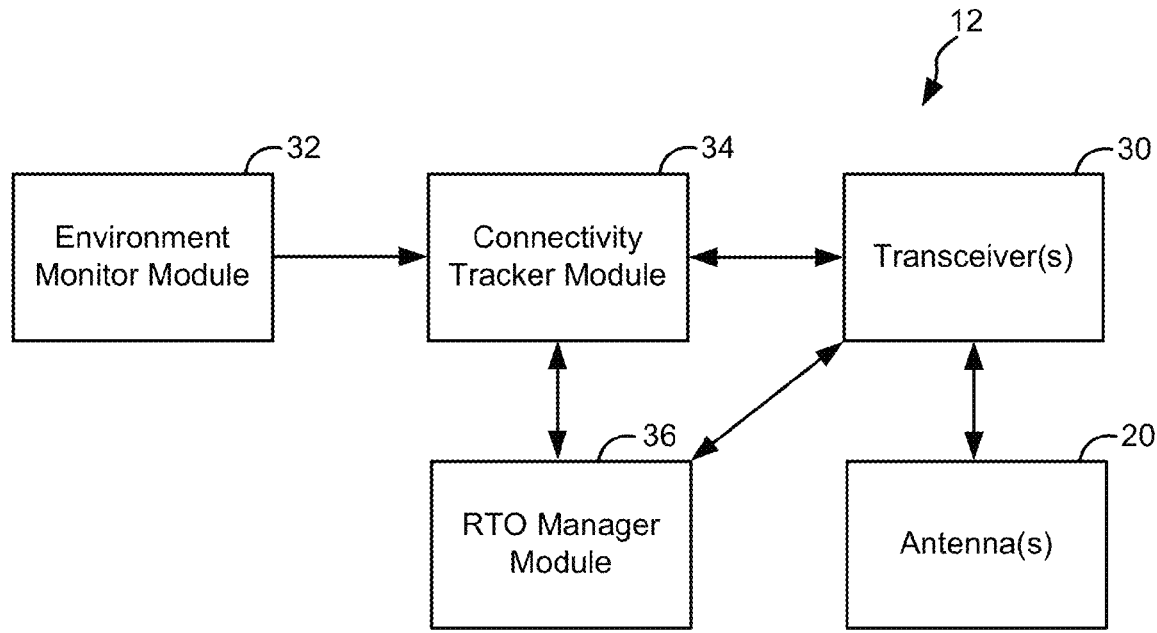
FIG. 3 is a block diagram of a system for managing a retransmission schedule of a mobile device.
Figure 4:
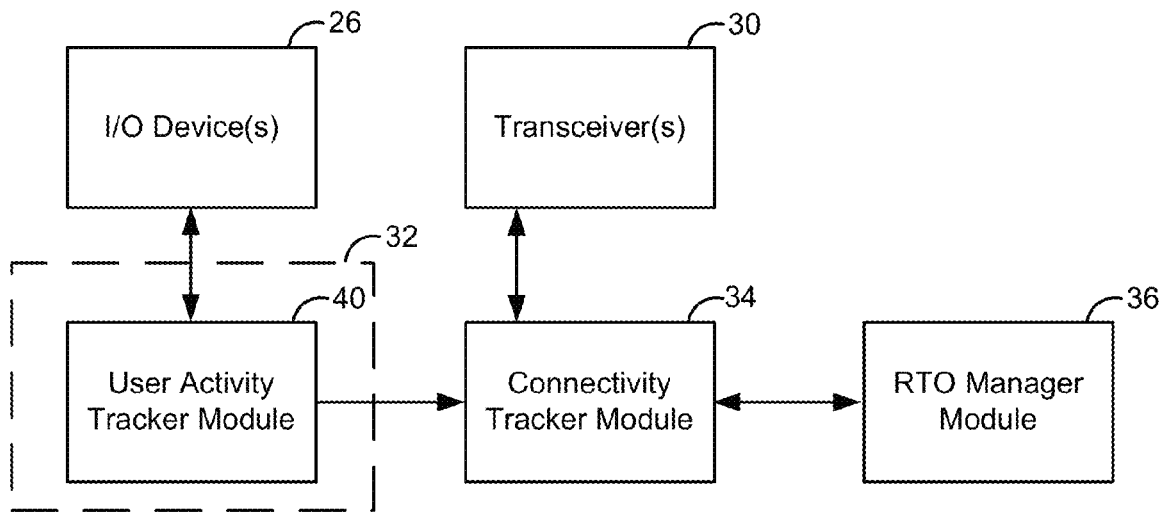
FIG. 4 is a block diagram of a system for controlling RTO length for a mobile device based on user interaction data.

FIG. 3 illustrates an example mobile device 12 that implements a system for leveraging contextual awareness to manage one or more RTO parameters. Antenna(s) 20 are implemented as described above to interact with one or more transceivers 30 in order to provide communication functionality for the mobile device 12. Transceiver(s) 30 can control both transmission and reception operation, or separate, dedicated transmitter and receiver modules can be utilized. Further, transceiver(s) 30 can be implemented in hardware and/or software (e.g., via a processor 20 executing instructions stored on a memory 22).

To regulate communications between the mobile device 12 and other entities in a network associated with the mobile device 12, the transceiver(s) 30 interact with a connectivity tracker module 34 and an RTO manager module 36. The connectivity tracker module 34 monitors the connectivity of the mobile device 12 and its surrounding local area based on information provided by various sources and/or the connectivity tracker module 34 itself. For example, transceiver(s) 30 can report location data, observed signal strength data, channel quality data, etc., to the connectivity tracker module 34. Further, transceiver(s) 30 can report whether an acknowledgement was received in response to a transmission sent by transceiver(s) 30.

The RTO manager module 36 maintains RTO parameters for respective TCP sessions or connections associated with the mobile device 12. TCP connections can be associated with respective applications at the mobile device 12; additionally or alternatively, a single application can leverage multiple TCP connections. The RTO manager module 36 initializes RTO parameters for the TCP connections to an initial value, e.g., zero or a small nonzero value. Upon failure of transceiver(s) 30 to receive an acknowledgment of previously sent data, retransmission of the data is scheduled at a time indicated by the RTO parameter for the TCP connection associated with the data. Upon successive failures to transmit the data, the RTO manager module 36 increases (e.g., exponentially) the corresponding RTO parameter.

To mitigate the unresponsiveness of the mobile device 12 in response to RTO backoff, an environment monitor module 32 observes a local environment associated with the mobile device 12 and its surrounding area. For example, the environment monitor module 32 can track user interaction with the mobile device 12, link layer connectivity in an area surrounding the mobile device 12, or the like. The environment monitor module 32 provides data relating to environmental observations to the connectivity tracker module 34, which utilizes the data as indicators of present connectivity. If, based on information received from the environment monitor module 32, the connectivity tracker module 34 infers that the mobile device is in an area of high wireless connectivity, the connectivity tracker module can instruct the RTO manager module 36 to undergo a RTO reset procedure associated with respective open TCP connections utilized by the mobile device. This procedure can include, e.g., setting corresponding RTO parameters to a predetermined value (e.g., zero or a small nonzero value, etc.), as well as resetting retransmit timer(s) associated with the RTO parameters. Upon completion of the RTO reset procedure associated with a given TCP connection, the RTO manager module 36 may also instruct the transceiver(s) to retry communication on the TCP connection without waiting for expiration of the corresponding retransmit timer. If, upon retrying communication on the TCP connection, the transceiver(s) 30 are still unable to successfully transmit and receive an acknowledgement, the RTO manager module 36 can increase the RTO parameter for the connection from either the initial value assigned to the RTO upon reset or a value associated with the RTO just prior to the reset.

By operating as described above, the RTO manager module 36 leverages observations of a local environment associated with the mobile device 12, as obtained by the environment monitor module 32, to adjust a given RTO parameter and associate said parameter with actions. The environment monitor module, connectivity tracker module, and/or RTO manager module 36 can be implemented in software, via a processor 20 executing instructions stored on a memory 22, in hardware, etc. For instance, one or more of modules 32-36 may be implemented within an operating system of the mobile device 12. Other implementations are also possible.

Local environment observations obtained by the environment monitor module 32 can include user interaction with an associated mobile device 12. In general, a user of a mobile device 12 is aware of the physical environment near the mobile device 12 and can predict connectivity. Thus, RTO values corresponding to one or more TCP connections can be reset when the user initiates interaction with the mobile device 12 via one or more I/O devices 26 (e.g., by pressing a button on a keypad or keyboard, manipulating a touch-sensitive surface such as a touchscreen or touchpad, etc.). A user activity monitor module 40 or the like can be implemented within the environment monitor module 32 to track such user interactions, which are in turn provided to a connectivity tracker module 34 as described above.

While traversing through zones of high and low connectivity, a user of a mobile device 12 is in general naturally inclined to coax an application running on the mobile device 12 to reactivate when connectivity improves. For example, a user operating a mobile web browser on a subway train may press a refresh button associated with the browser upon entering a subway station due to increased wireless connectivity within the station. Conventionally, the mobile web browser would be required to wait for a retransmit timer controlled by the RTO to elapse before being enabled to request data via TCP connection(s) irrespective of user input. In contrast, the connectivity tracker module 34 determines that the reason the RTO was backed off (e.g., loss of connectivity) no longer applies due to the user input and resets the RTO. In addition to resetting the RTO, the transceiver(s) 30 can be enabled at the time connectivity is identified as restored without waiting for a current RTO period to expire (e.g., by resetting associated retransmit timers in addition to the RTO parameters), improving user experience.

The RTO manager module 36 can adjust RTO parameters for all open applications and/or TCP sessions, or alternatively a selection of applications and/or sessions can be processed. For instance, one or more applications active on the mobile device 12 may be identified such that only RTO values associated with active sessions are adjusted. Further, if any session successfully recovers, the RTO manager module 36 can similarly adjust RTO for one or more other sessions. To prevent all sessions from attempting to retransmit simultaneously, varying RTO values can be assigned to the respective sessions based on random distribution and/or other criteria. An active or foreground application can be identified (e.g., by an operating system and/or other components of the mobile device 12) such that user interaction is used as a basis to reset RTO values associated with the mobile device 12 only if the active or foreground application has open TCP connections. In this case, the identify of the active application(s) need not be known; instead, the RTO manager module 36 can operate on the basis of whether any active applications have open TCP connections.

Figure 5:
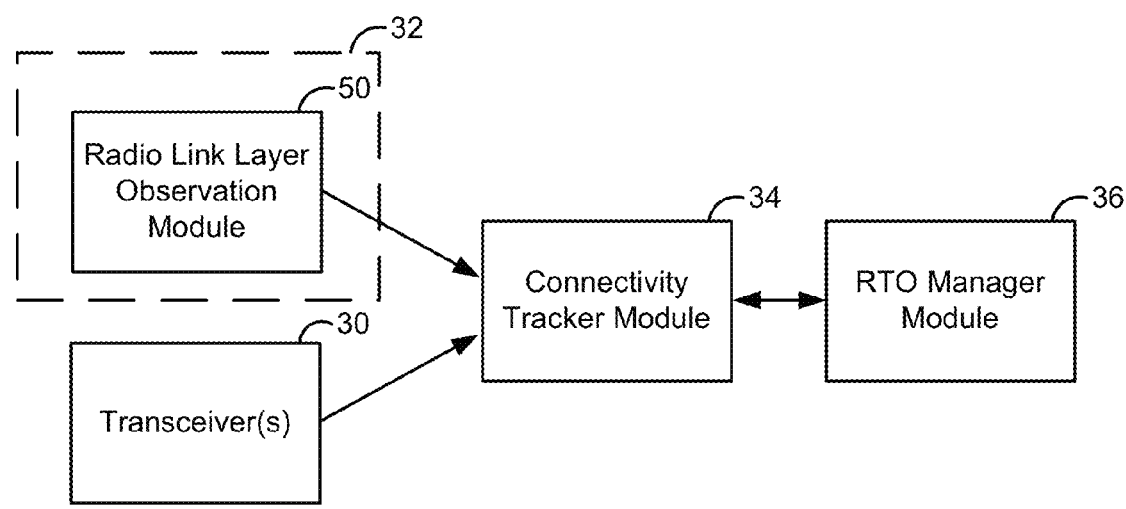
FIG. 5 is a block diagram of a system for controlling RTO length for a mobile device based on link layer connectivity data.

Additionally, the radio link layer (RLL) associated with a mobile device 12 is aware of its local wireless environment and can detect when data connectivity is available. Thus, a RLL observation module 50 can be implemented within and/or separately from an environment monitor module 32 in order to reduce RTO values when data connectivity is restored, as shown by FIG. 5. In one embodiment, the RTO manager module 36 (e.g., as implemented via an operating system or other means) sets the RTO of all current TCP sessions to a low or minimum value (e.g., approximately zero) whenever data connectivity is restored. As noted above, random factors can be introduced into RTO values for different sessions such that all sessions do not attempt to retransmit simultaneously. As further noted above, the RTO manager module 36 can in some cases adjust the RTO for only active application(s). If the RLL observation module 50 detects that any session has successfully recovered, then the RTO for all other sessions may be similarly adjusted as well.

The RLL observation module 50 can be implemented at a modem or other mechanisms associated with the mobile device 12. In such an implementation, the RLL observation module 50 observes link layer connectivity at the modem and instructs the RTO manager module to reduce the RTO if radio signals are observed. Other implementations of the RLL observation module 50 are also possible.

Figure 6:
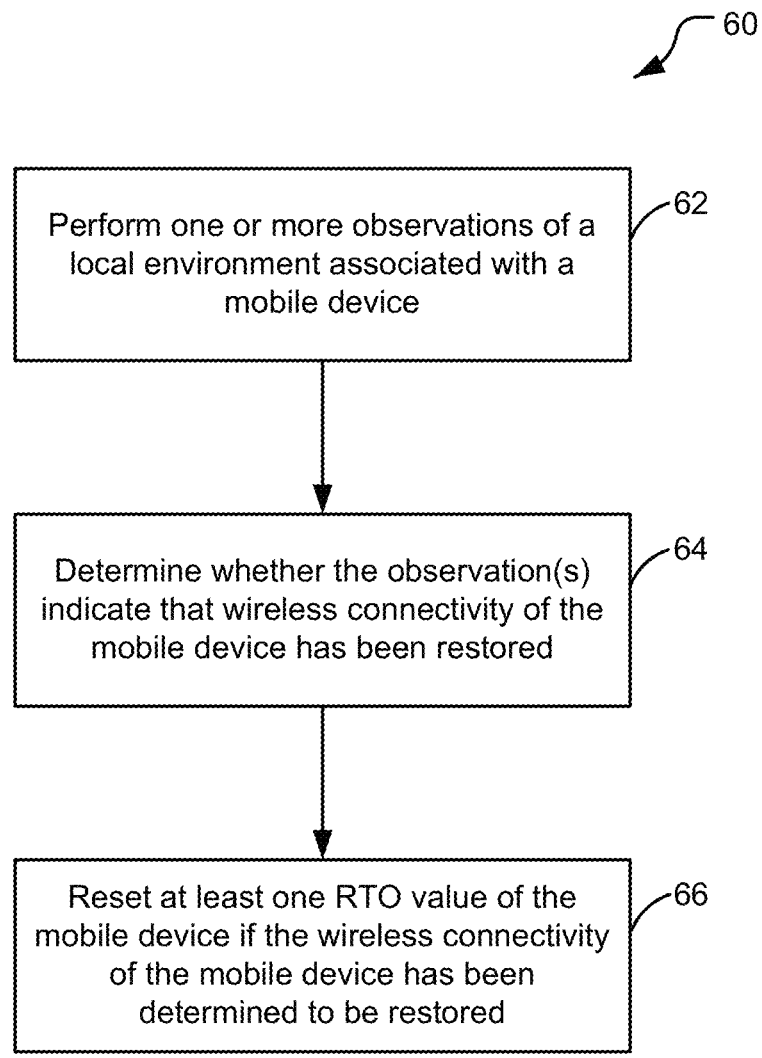
FIGS. 6-7 are block flow diagrams of processes of managing an RTO parameter of a mobile device based on environmental observations.

Referring to FIG. 6, with further reference to FIGS. 1-5, a process 60 of managing an RTO parameter of a mobile device based on environmental observations includes the stages shown. The process 60 is, however, an example only and not limiting. The process 60 can be altered, e.g., by having stages added, removed, rearranged, combined, and/or performed concurrently. Still other alterations to the process 60 as shown and described are possible.

At stage 62, one or more observations of a local environment associated with a mobile device 12 are performed. Such observations can be performed by an environment monitor module 32 or the like, which can be implemented via a processor 20 executing instructions stored on a memory 22, among other implementations.

At stage 64, it is determined based on the observations performed at stage 62 whether wireless connectivity of the mobile device 12 has been restored. If wireless connectivity has been determined to have been restored, at least one RTO value of the mobile device 12 is reset at stage 66. The operations at stages 64 and 66 can be performed by a connectivity tracker module 34, an RTO manager module 36, or the like. Said modules 34-36 can be implemented via a processor 20 executing instructions stored on a memory 22 and/or by any other suitable means.

Figure 7:
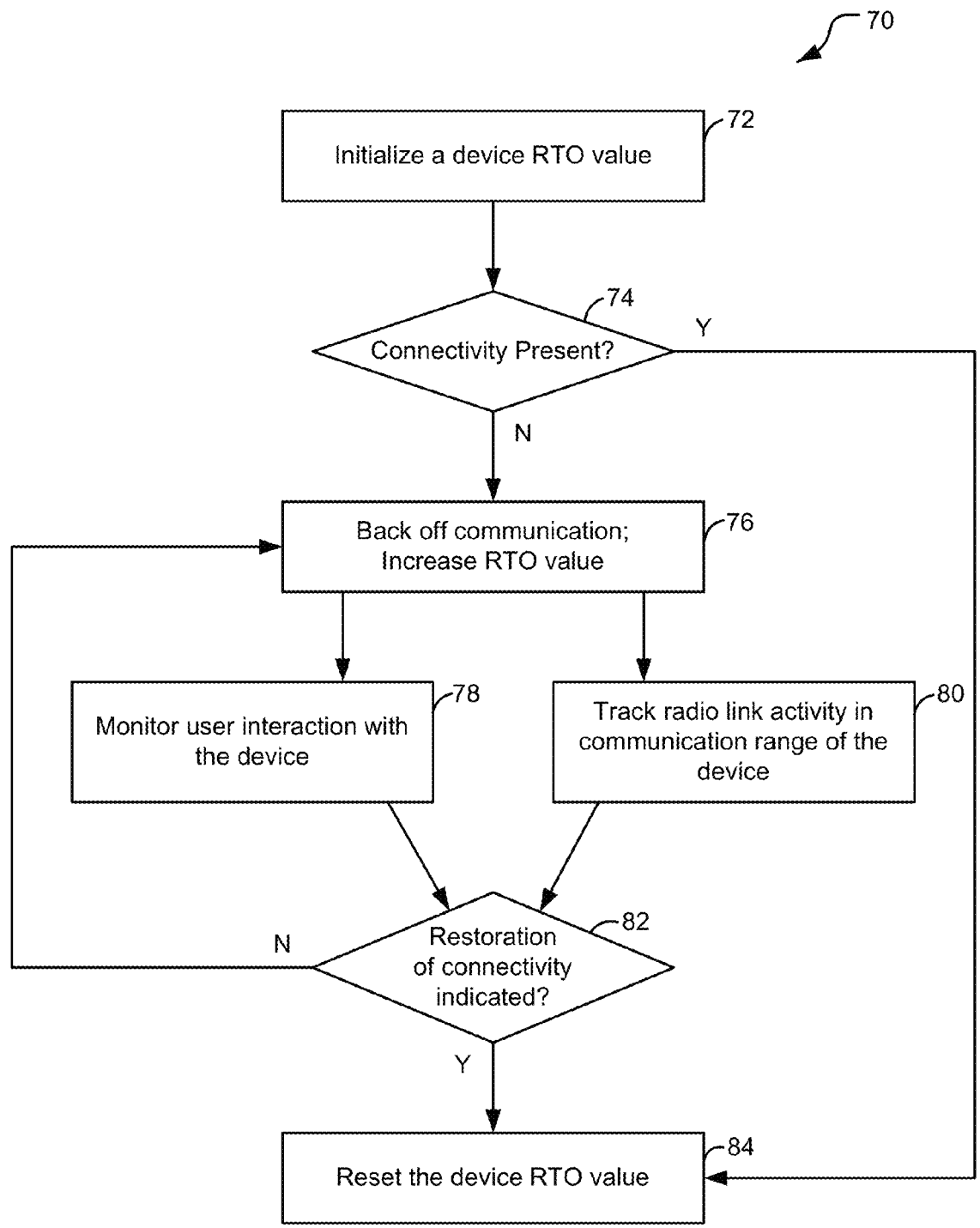

Referring to FIG. 7, with further reference to FIGS. 1-5, another process 70 of managing an RTO parameter of a mobile device based on environmental observations includes the stages shown. The process 70 is, however, an example only and not limiting. The process 70 can be altered, e.g., by having stages added, removed, rearranged, combined, and/or performed concurrently. Still other alterations to the process 70 as shown and described are possible.

An RTO value corresponding to a mobile device 12 is initialized at stage 72, and at stage 74 it is determined whether initial wireless connectivity is present within a local environment associated with the mobile device. If connectivity is not present, any requested communication associated with the RTO value is backed off according to the present RTO value, and the RTO value is increased (e.g., according to exponential RTO backoff procedures as generally known in the art), as shown at stage 76.

After backing off the RTO as shown at stage 76, one or more observations of the local environment of the mobile device 12 are conducted as shown at stages 78 and 80. In particular, at stage 78, user interaction with the mobile device 12 (e.g., via I/O devices 26) are monitored, e.g., using a user activity tracker module 40. At stage 80, radio link activity within a communication range of the mobile device 12 is tracked, e.g., using a RLL observation module 50. The user activity tracker module 40 and RLL observation module can be implemented in various manners, such as via software 24 stored on a memory 22 and executed by a processor 20, etc.

Based on the observations at stages 78 and/or 80, at stage 82 it is determined whether said observations indicate that connectivity has been restored. If connectivity is indicated to have been restored, or if connectivity is found to be present at stage 74, the RTO value under consideration is reset at stage 84, e.g., via a RTO manager module 36 implemented in software and/or hardware. Otherwise, the process 70 returns to stage 76, where the RTO is further increased and the observation(s) are again performed.

The monitoring or observation operations shown at stages 78 and 80 can occur continuously (e.g., via a background process of an operating system, etc.), or alternatively said operations can occur at respective time intervals (e.g., according to a schedule, in response to various triggering events, etc.). Additionally, once the RTO value is reset at stage 84 upon identifying connectivity at stage 82 and/or stage 74, a TCP session associated with the RTO value can be instructed to ignore the present RTO value and retry transmission. In another example, an existing RTO can be replaced with the reset RTO, such that the transmission is retried substantially immediately if the RTO reset value is zero or approximately zero.

One or more of the components, steps, features and/or functions illustrated in FIGS. 1, 2, 3, 4, 5, 6 and/or 7 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2, 3, 4 and/or 5 may be configured to perform one or more of the methods, features, or steps described in FIGS. 6 and/or 7. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium," "computer-readable medium," and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium," "computer-readable medium," and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A mobile device comprising:
   an environment monitor module configured to perform one or more observations of a local environment associated with the mobile device;
   a connectivity tracker module communicatively coupled to the environment monitor module and configured to determine whether the one or more observations indicate wireless connectivity of the mobile device has been restored; and
   a retransmit timeout (RTO) manager module communicatively coupled to the connectivity tracker module and configured to replace at least one current RTO value of the mobile device with a predetermined initial RTO value prior to an expiration of at least one current RTO period associated with the at least one current RTO value if the wireless connectivity of the mobile device has been determined to be restored wherein the predetermined initial RTO value is less than the at least one current RTO value and further wherein the at least one current RTO value and the predetermined initial RTO value are Transmission Control Protocol (TCP) backoff mechanism parameters.

2. The mobile device of claim 1 wherein the predetermined initial RTO value is approximately zero.

3. The mobile device of claim 1 wherein the RTO manager module is further configured to identify one or more active TCP sessions associated with the mobile device and to replace RTO values corresponding to the one or more active TCP sessions.

4. The mobile device of claim 1 wherein the RTO manager module is further configured to identify one or more active applications associated with the mobile device and to replace RTO values corresponding to TCP sessions associated with the one or more active applications.

5. The mobile device of claim 1 wherein the environment monitor module comprises a user activity tracker module configured to monitor user interaction with the mobile device.

6. The mobile device of claim 1 wherein the environment monitor module comprises a radio link layer (RLL) observation module configured to observe local link layer connectivity associated with the mobile device.

7. The mobile device of claim 1 wherein the RTO manager module is further configured to replace the at least one current RTO value of the mobile device if at least one TCP session associated with the mobile device successfully completes a transmission or reception.

8. The mobile device of claim 1 wherein the RTO manager module is further configured to reset a retransmit timer associated with the at least one current RTO value of the mobile device if the wireless connectivity of the mobile device has been determined to be restored.

9. The mobile device of claim 3 wherein the RTO manager module is further configured to apply random offsets to the RTO values corresponding to the one or more active TCP sessions.

10. The mobile device of claim 5 wherein the RTO manager module is further configured to identify an application associated with the user interaction and to replace the at least one current RTO value of the mobile device if the application associated with the user interaction has at least one open TCP session.

11. The mobile device of claim 6 wherein the RTO manager module is further configured to replace the at least one current RTO value of the mobile device if the RLL observation module indicates that link layer connectivity associated with the mobile device is restored.

12. A method of adjusting Transmission Control Protocol (TCP) retransmit timeout (RTO) values of a mobile device, the method comprising:
   performing one or more observations of a local environment associated with the mobile device;
   determining whether the one or more observations indicate wireless connectivity of the mobile device has been restored; and
   replacing at least one current RTO value of the mobile device with a predetermined initial RTO value prior to an expiration of at least one current RTO period associated with the at least one current RTO value if the wireless connectivity of the mobile device has been determined to be restored wherein the predetermined initial RTO value is less than the at least one current RTO value and further wherein the at least one current RTO value and the predetermined initial RTO value are TCP backoff mechanism parameters.

13. The method of claim 12 wherein the predetermined initial RTO value is approximately zero.

14. The method of claim 12 further comprising identifying one or more active TCP sessions associated with the mobile device, wherein the replacing comprises replacing RTO values corresponding to the one or more active TCP sessions.

15. The method of claim 12 further comprising identifying one or more active applications associated with the mobile device, wherein the replacing comprises replacing RTO values corresponding to TCP sessions associated with the one or more active applications.

16. The method of claim 12 wherein the performing comprises monitoring user interaction with the mobile device.

17. The method of claim 12 wherein the performing comprises observing local link layer connectivity associated with the mobile device.

18. The method of claim 12 wherein the replacing comprises replacing the at least one current RTO value of the mobile device if at least one TCP session associated with the mobile device successfully completes a transmission or reception.

19. The method of claim 12 further comprising replacing a retransmit timer associated with the at least one current RTO value of the mobile device if the wireless connectivity of the mobile device has been determined to be restored.

20. The method of claim 14 wherein the resetting further comprises applying random offsets to the RTO values corresponding to the one or more active TCP sessions.

21. The method of claim 16 further comprising identifying an application associated with the user interaction, wherein the replacing comprises replacing the at least one current RTO value of the mobile device if the application associated with the user interaction has at least one open TCP session.

22. The method of claim 17 wherein the replacing comprises replacing the at least one current RTO value of the mobile device if the local link layer connectivity associated with the mobile device is indicated to have been restored.

23. A mobile device comprising:
means for performing one or more observations of a local environment associated with the mobile device;
means for determining whether the one or more observations indicate wireless connectivity of the mobile device has been restored; and
means for replacing at least one current retransmit timeout (RTO) value of the mobile device with a predetermined initial RTO value prior to an expiration of at least one current RTO period associated with the at least one current RTO value if the wireless connectivity of the mobile device has been determined to be restored wherein the predetermined initial RTO value is less than the at least one current RTO value and further wherein the at least one current RTO value and the predetermined initial RTO value are Transmission Control Protocol (TCP) backoff mechanism parameters.

24. The mobile device of claim 23 wherein the predetermined initial RTO value is approximately zero.

25. The mobile device of claim 23 further comprising means for identifying one or more active TCP sessions associated with the mobile device, wherein the means for replacing comprises means for replacing RTO values corresponding to the one or more active TCP sessions at least in part by applying random offsets to the RTO values corresponding to the one or more active TCP sessions.

26. The mobile device of claim 23 wherein the means for performing one or more observations comprises means for monitoring user interaction with the mobile device.

27. The mobile device of claim 23 wherein the means for performing the one or more observations comprises means for observing local link layer connectivity associated with the mobile device.

28. The mobile device of claim 27 wherein the means for replacing comprises means for replacing the at least one current RTO value of the mobile device if the local link layer connectivity associated with the mobile device is indicated to have been restored.

29. The mobile device of claim 23 wherein the means for replacing comprises means for replacing the at least one current RTO value of the mobile device if at least one TCP session associated with the mobile device successfully completes a transmission or reception.

30. The mobile device of claim 23 further comprising means for resetting a retransmit timer associated with the at least one current RTO value of the mobile device if the wireless connectivity of the mobile device has been determined to be restored.

31. The mobile device of claim 26 further comprising means for identifying an application associated with the user interaction, wherein the means for replacing comprises means for replacing the at least one current RTO value of the mobile device if the application associated with the user interaction has at least one open TCP session.

32. A computer program product residing on a non-transitory processor-readable medium and comprising processor-readable instructions configured to cause a processor to:
perform one or more observations of a local environment associated with a mobile device;
determine whether the one or more observations indicate wireless connectivity of the mobile device has been restored; and
replace at least one current retransmit timeout (RTO) value of the mobile device with a predetermined initial RTO value prior to an expiration of at least one current RTO period associated with the at least one current RTO value if the wireless connectivity of the mobile device has been determined to be restored wherein the predetermined initial RTO value is less than the at least one current RTO value and further wherein the at least one current RTO value and the predetermined initial RTO value are Transmission Control Protocol (TCP) backoff mechanism parameters.

33. The computer program product of claim 32 wherein the predetermined initial RTO value is approximately zero.

34. The computer program product of claim 32 wherein the processor-readable medium further comprises processor-readable instructions configured to cause the processor to identify one or more active TCP sessions associated with the mobile device, and the processor-readable instructions configured to cause the processor to reset comprise processor-readable instructions configured to cause the processor to replace RTO values corresponding to the one or more active TCP sessions at least in part by applying random offsets to the RTO values corresponding to the one or more active TCP sessions.

35. The computer program product of claim 32 wherein the processor-readable instructions configured to cause the processor to perform the one or more observations comprise processor-readable instructions configured to cause the processor to monitor user interaction with the mobile device.

36. The computer program product of claim 32 wherein the processor-readable instructions configured to cause the processor to perform the one or more observations comprise processor-readable instructions configured to cause the processor to observe local link layer connectivity associated with the mobile device.

37. The computer program product of claim 32 wherein the processor-readable instructions configured to cause the processor to replace comprise processor-readable instructions configured to cause the processor to replace the at least one current RTO value of the mobile device if at least one TCP session associated with the mobile device successfully completes a transmission or reception.

38. The computer program product of claim 32 wherein the processor-readable medium further comprises processor-readable instructions configured to cause the processor to reset a retransmit timer associated with the at least one current RTO value of the mobile device if the wireless connectivity of the mobile device has been determined to be restored.

39. The computer program product of claim 35 wherein the processor-readable medium further comprises processor-readable instructions configured to cause the processor to identify an application associated with the user interaction, and the processor-readable instructions configured to cause the processor to replace comprise processor-readable instructions configured to cause the processor to replace the at least one current RTO value of the mobile device if the application associated with the user interaction has at least one open TCP session.

40. The computer program product of claim 36 wherein the processor-readable instructions configured to cause the processor to replace comprise processor-readable instructions configured to cause the processor to replace the at least one current RTO value of the mobile device if the local link layer connectivity associated with the mobile device is indicated to have been restored.

* * * * *